Dec. 27, 1932.  J. A. GORDON  1,892,210
FILTER
Filed May 20, 1930
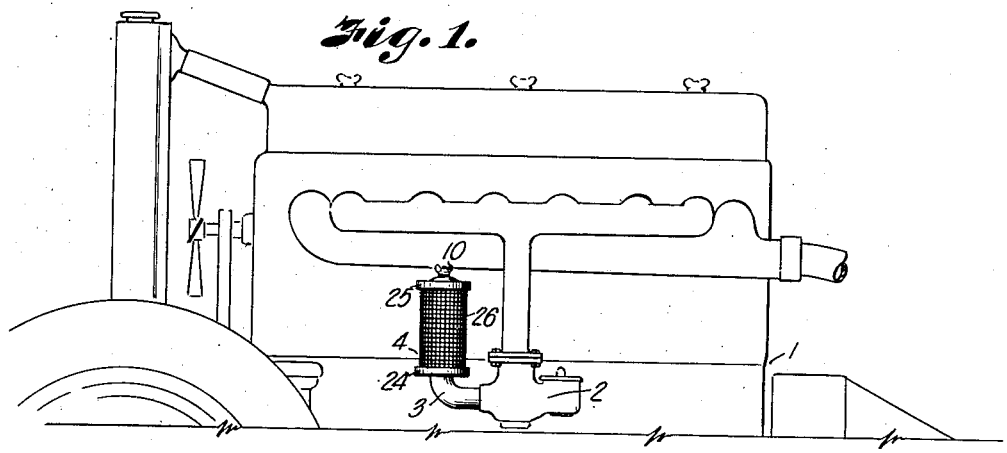
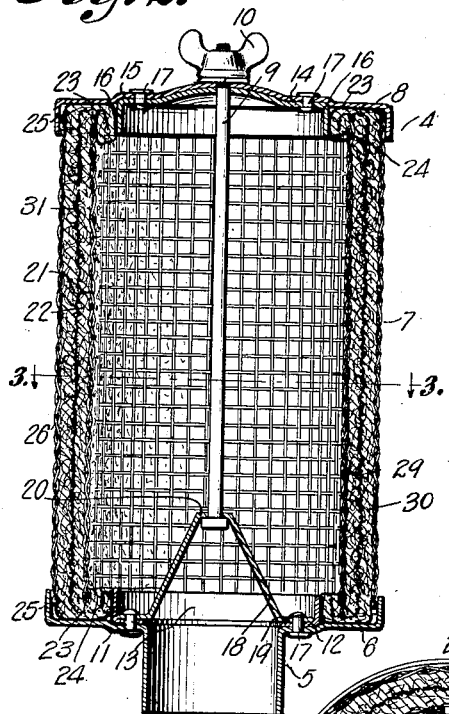
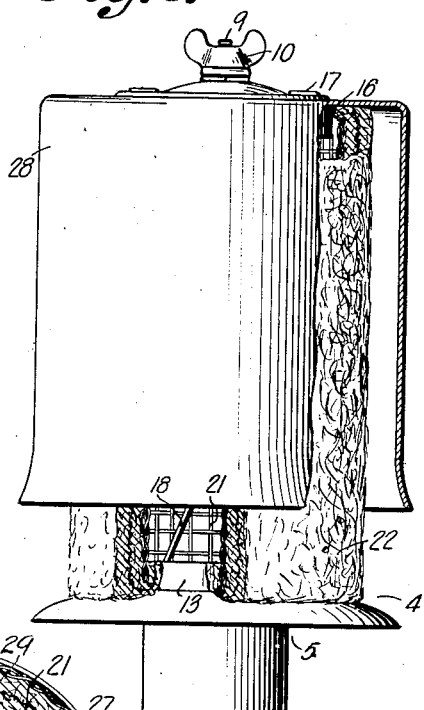
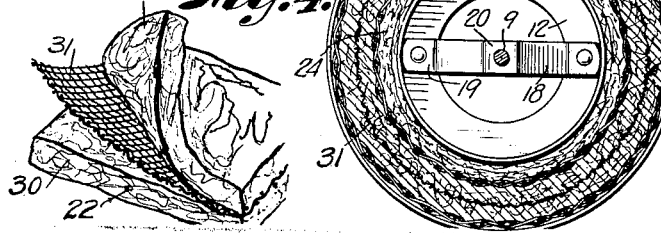
INVENTOR
John A. Gordon
BY Arthur C. Brown
ATTORNEY Patented Dec. 27, 1932

1,892,210

UNITED STATES PATENT OFFICE

JOHN A. GORDON, OF KANSAS CITY, MISSOURI

FILTER

Application filed May 20, 1930. Serial No. 453,912.

My invention relates to filters and more particularly to filters applicable to air intakes of carburetors of internal combustion engines for filtering out dust and dirt from the stream of air moving toward the carburetor, the principal objects of the invention being to provide a filter having an improved filter element including hair felt, and interlaid wire cloth for enhancing the filtering effect of the felt, to locate and retain the filtering bed in engagement with all adjacent surfaces of metal frame members for assuring collection of dust from air passing into the filter, to provide means for catching dust dislodged from a filtering member, and to prevent dust collected on a filter from falling into the carburetor when the filter is disassembled for cleansing or replacement.

In accomplishing these and other objects of the invention, I have provided improved details of structure, the preferred forms of which are illustrated in the accompanying drawing, wherein:

Fig. 1 is a fragmentary elevation of an automobile engine, illustrating an air filter embodying my invention attached to the air inlet of the carburetor.

Fig. 2 is a central vertical section of the filter.

Fig. 3 is a cross section of the filter on the line 3—3, Fig. 2.

Fig. 4 is a fragmentary perspective view of the filtering member, portions being partly disassembled to show the reinforced structure.

Fig. 5 is an elevational view partly in section of a modified form of the filter including a hood.

Referring in detail to the drawing:

1 designates an automobile engine, 2 a carburetor having an air intake pipe 3, and 4 my improved filter having a depending tubular leg or flange 5 engageable with the pipe for mounting the filter on the carburetor.

The leg 5 comprises preferably an integral portion of an annular flange-like seat 6 forming a lower head member adapted to receive and support a preferably cylindrical filtering element 7 which is retained in engagement with the seat by a relatively resilient head disk 8, a bolt 9 and a nut 10 on the upper end of the bolt, as presently described.

The seat 6 is depressed adjacent the opening thereof to provide an annular recess 11 to receive a ring 12 having an upstanding peripheral flange 13, and a seating recess 14 is similarly formed in the head disk 8 in registry with the lower recess to receive a reinforcing plate 15 having a depending flange 16, the ring and plate being secured to the seat 6 and retainer disk 8 by rivets 17 located in the recesses.

Mounted on the seat 6 is a strap 18 having oppositely projecting end flanges or toe portions 19 registering with the recess 11 in the seat and secured thereto by the rivets that attach the reinforcing ring to the seat, and including upwardly converging portions connected by a bar portion 20 located in the axis of the filter and apertured to receive the bolt.

The head disk 8 is preferably bowed outwardly at its center to provide a convex portion, the plate 15 is bowed to conform to the contour of the disk and engage the same, and the two members are provided with registering axial apertures to receive the bolt.

The strap 18 is preferably mounted on the ring 12, whereby the ring is firmly retained between the strap and the seat.

The filter element includes a cylindrical screen or supporting core 21 having length limited as later described and formed of relatively stiff mesh wire having relatively large openings, and a filter member or bed 22 comprising a composite distortable flexible tubular body longer than the screen and later described in detail. The ends of the filter member 22 are distorted to form flanges 23 projecting inwardly over the ends of the wire cylinder, and comprising gasket-like anchoring and sealing rings adapted to be pressed into engagement with the seat 6, disk 8 and wire cylinder, when the device is assembled.

The opposite end edges of the filter member are further bent retractively over the inner surface of the wire cylinder to form sealing rings 24 engaging the outer surfaces of the flanges 13 and 16, and having substantially the same length as said flanges and preferably being slightly longer than the flanges.

The seat 6 and disk 8 are provided with peripheral flanges 25 which may extend in opposite directions as illustrated in Fig. 2 to form pockets to receive the filtering element and retain the opposite ends of the filtering member to the flanges 13 and 16.

A second screen or wire mesh jacket 26 similar to the core 21 may encircle the filter member 22 to retain the same in secure engagement with the inner wire cylinder and provide a protective cover for the filtering element, the construction of edge flanges 25 of the disk and the seat shown in Fig. 2 being preferred when the outer wire jacket is used.

The wire mesh members 21 and 26 are preferably formed of sheets having overlapping vertical edges secured together by rivets 27 as illustrated in Fig. 3.

The diameter of the head disk 8 may be enlarged, and the peripheral flange thereof elongated to form a hood 28 having a flaring lower end spaced from the lower end of the filter element for protecting the filter from coarse material, dust, and the like when the atmosphere adjacent the carburetor contains an excessive amount of foreign matter.

When the hood is used, the flange of the seat 6 may be turned downwardly and arcuately outwardly, and the outer wire screen may be omitted, as illustrated in Fig. 5.

The composite filter member 22 includes preferably a pair of mat-like porous webs or felt blankets 29 and 30 formed of relatively loosely connected hair through which air may pass relatively freely, but which will entangle dust particles, and a reinforcing and stiffening sheet 31 of wire cloth between the felt members. The reinforcing sheet is preferably formed of small wires and has small openings, and is secured to both of the felt members by suitable means such as glue to prevent slipping of the felt members relatively to each other.

Attention is called to the length of the core 21, relative to the filter member 22 and the jacket 26, the filter member being sufficiently larger than the core 21 to permit the ends of the former to be bent over the latter to form the flanges 23 and 24, and the jacket 26 being shorter than the core 21 to prevent binding of the jacket against the disk 14 and seat 6.

In assembling the filter in the form shown in Figs. 1 to 3, the ring 12 and strap 18 are riveted to the seat 6, and the plate 15 is riveted to the head disk 14 to form the frame members. The composite filter member 22 is then mounted on the core 21, and the jacket is mounted over the filter member.

The ends of the filter member are then bent inwardly over the end edges of the core 21 to form the flanges 24, and the assembled filtering element is mounted in the frame members, the flanges 24 engaging the outer peripheries of the flanges 13 and 16. The bolt may be inserted in the strap and head at any convenient stage of assembly, and the nut may be advanced on the bolt to urge the ends of the filtering element into sealing engagement with the bottoms of the pockets formed by the seat 6, head disk 14, and flanges 25.

The end edges of the relatively stiff core tend to pinch the feet flanges 23 against the head disk and seat, and thus form air tight seals at both ends of the filter. The end flanges 24 of the feet members will tend to catch dust that might pass the ends of the members.

The filter bed having the fine mesh wire cloth between layers of felt is thus made stronger while porosity is retained. Uniform thickness of the filter bed and equal porosity over substantially the whole area of the bed are further assured through the use of the wire cloth. The character of the reinforcing member also effects deflection of air passing through the bed, and deflects dirt passing from the outer layer of felt toward the inner layer, to assure capture of dirt by the inner layer.

A filter bed is thus formed that is strong and still flexible, and has increased durability.

When the upwardly presented nut is removed, and the head lifted, the filtering assembly may be removed from the seat 6, for cleaning or replacement.

Fine dust dislodged from the felt when the filter bed is removed, will lodge in the lower pocket formed by the seat 6, flange 24 thereof, and flange 13 of the ring 12, and fine dust will be retained in said pocket during operation of the device, thus preventing entrance of dust into the carburetor.

What I claim and desire to secure by Letters Patent is:

1. In a filter, head members each having spaced concentric flanges, concentrically spaced cylindrical wire mesh members mounted between said flanges and spaced from the head members, a filtering body between said wire mesh members including an embedded coextensive reinforcing member of wire mesh, the ends of said filtering body being retractively bent over the inner wire member and seated in compressed condition between the head flanges, and means for urging the filter heads toward each other.

2. In a filter, head members each having spaced concentric flanges to form annular seats, a cylindrical perforate core having ends overlapping said inner concentric flanges and extending within said seats, a filter body enveloping said perforate core and consisting of a preformed hair felt compressed to a definite thickness and shape and having its ends bent over the ends of said core and engaging said seats, and means for drawing the heads together to compress the bent over ends of the filter in said seats and against said flanges to form seals with the heads.

In testimony whereof I affix my signature.

JOHN A. GORDON.